J. ADAMS.
Glass-Vessels or Buckets.

No. 156,401. Patented Nov. 3, 1874.

Witnesses
R. R. Boelz
Frederick Standish

Inventor
John Adams
by
Bakewell & Kerr
Atty's

UNITED STATES PATENT OFFICE.

JOHN ADAMS, OF PITTSBURG, PENNSYLVANIA.

IMPROVEMENT IN GLASS VESSELS OR BUCKETS.

Specification forming part of Letters Patent No. 156,401, dated November 3, 1874; application filed August 12, 1874.

*To all whom it may concern:*

Be it known that I, JOHN ADAMS, of Pittsburg, in the county of Allegheny and State of Pennsylvania, have invented a new and useful Improvement in Glass Vessels or Buckets; and I do hereby declare the following to be a full, clear, and exact description thereof, reference being had to the accompanying drawings forming a part of this specification, in which—

Figure 1:
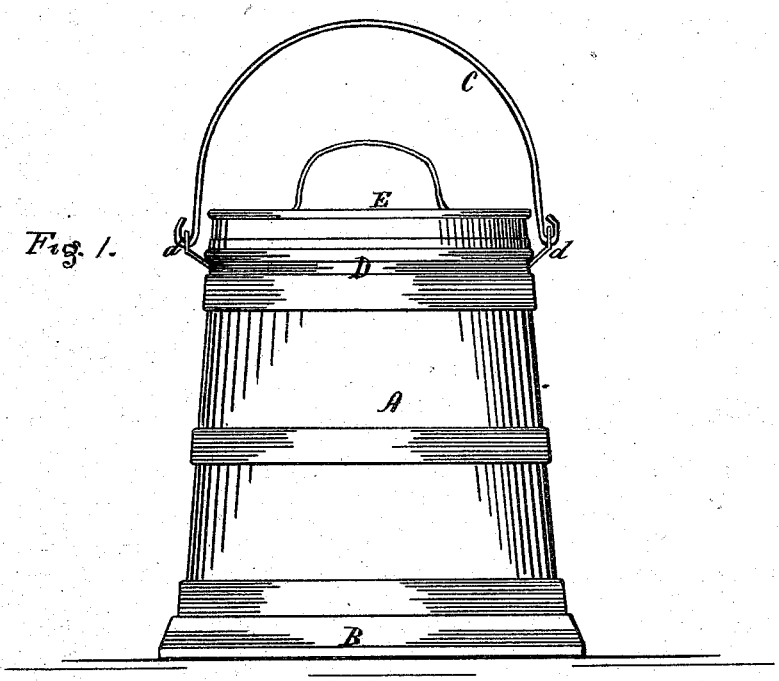
Figure 2:
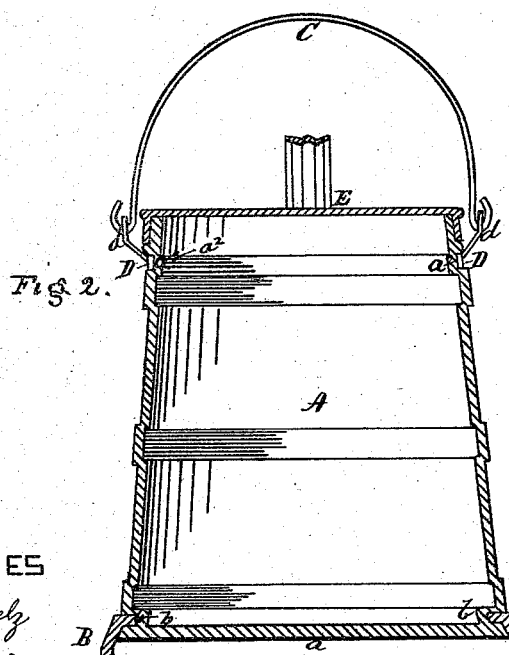

Figure 1 is a view of my improved bucket, and Fig. 2 is a vertical section of the same.

Like letters refer to like parts in the several figures.

My invention relates to articles of glassware intended for heating liquids, packing lard and mince-meat, and for similar purposes; and it consists in a glass vessel the bottom of which is protected by a metallic ring or hoop, and the top provided with a bail, the whole forming a glass bucket useful in packing lard, mince-meat, berries, and other articles.

In the drawing, A represents the glass bucket or vessel, protected about its bottom by the metallic rim B, and provided with the bail C, attached by means of ears $d$, secured to an encircling band, D. E is a cap or cover, which may be of metal or glass, as preferred.

In constructing this article, the base-ring B, preferably heated, is placed within the mold, and the glass vessel A blown within the same, so that the ring B is seated within a recess, $b$, in the lower portion of the vessel, the bottom $a$ of the vessel being raised above the lower edge of the ring B, so that the glass bottom shall not come in contact with the surface upon which the article rests. D is a metallic band seated within a recess, $a^2$, formed in the upper portion of the vessel A, and it may be secured to the vessel by soldering the ends of the band together, or may be attached to the vessel by blowing the vessel within the ring, as in the case of B. This ring D is provided with the ears $d$ for attaching the bail C.

The cap E may be formed to slip over the mouth of the bucket or vessel, or within the same, and to rest upon a flange in any of the known forms, and the body A of the vessel may be ornamented by rings or other suitable ornamentation made in the mold in the usual manner for making glassware.

This covers the general construction of the vessel invented by me, and the advantages thereof are as follows:

I produce a glass vessel which may be usefully employed in the heating of water or other liquids, and which will not crack or break under the effects of heat, as it is protected from the direct contact with the stove by the base-ring B. The ring B, being of metal, will expand under the influence of heat more rapidly than the glass, and in contracting evenly is not liable to break the vessel, and the ring will also prevent the glass, when heated, from coming in contact with any substance liable to suddenly cool it. I obtain a neat transparent vessel for packing mince-meat, berries, lard, and similar articles now commonly sold in such packages, which enables the contained article to be examined and its condition at all times seen.

The bucket is not liable to break, being protected by the metallic ring at the base, and by the ring to which the bail is attached, and it is an article readily cleansed from any contained matter, so as to be of use after the original package has been broken, which is a great advantage over the buckets commonly used for similar purposes, they being made of tin, wood, and other materials, which affect the contained matter, often injuring the taste as well as the sale thereof, and are of no use after the original package has once been broken.

Having thus described my invention, what I claim, and desire to secure by Letters Patent, is—

As a new article of manufacture, the glass vessel or bucket having the metal base-ring B, projecting below the bottom of the vessel, and provided with the ring D and bail C, substantially as described.

In testimony whereof I, the said JOHN ADAMS, have hereunto set my hand.

JOHN ADAMS.

Witnesses:
F. W. RITTER, Jr.,
T. B. KERR.